United States Patent [19]

Ayers

[11] 4,381,994
[45] May 3, 1983

[54] SPILLED OIL SKIMMER KIT

[75] Inventor: Ray R. Ayers, Houston, Tex.

[73] Assignee: Shell Oil Company, Houston, Tex.

[21] Appl. No.: 4,417

[22] Filed: Jan. 18, 1979

Related U.S. Application Data

[63] Continuation-in-part of Ser. No. 943,100, Sep. 18, 1978, abandoned, which is a continuation of Ser. No. 817,652, Jul. 21, 1977, abandoned, which is a continuation of Ser. No. 737,939, Nov. 2, 1976, abandoned.

[51] Int. Cl.³ .................................................. B01D 2/00
[52] U.S. Cl. ................................ 210/120; 210/242.3; 210/923
[58] Field of Search ......... 210/120, 242, 83, DIG. 25, 210/DIG. 26, 242.3, 923; 114/219

[56] References Cited

U.S. PATENT DOCUMENTS

| | | | |
|---|---|---|---|
| 2,433,569 | 12/1947 | Marashi, Jr. | 114/119 |
| 3,211,123 | 10/1965 | Foss | 114/219 |
| 3,540,403 | 11/1970 | Russell | 114/219 |
| 3,572,506 | 3/1971 | Bandy, Jr. | 210/120 |
| 3,612,280 | 10/1971 | Fitzgerald | 210/DIG. 25 |
| 3,653,510 | 4/1972 | Fitzgerald | 210/DIG. 25 |
| 3,700,593 | 10/1972 | Bezemer et al. | 210/DIG. 26 |
| 3,715,034 | 2/1973 | Ivanoff | 210/DIG. 25 |
| 3,802,563 | 4/1974 | Sasaki | 210/120 |
| 3,844,944 | 10/1974 | Mercuri | 210/DIG. 25 |
| 3,966,614 | 6/1976 | Ayers | 210/DIG. 25 |
| 3,979,292 | 9/1976 | Kuhn | 210/120 |
| 3,983,034 | 9/1976 | Wilson | 210/DIG. 25 |
| 4,055,136 | 10/1977 | Fujisawa | 114/219 |

*Primary Examiner*—Frank A. Spear, Jr.

[57] ABSTRACT

A kit for collecting spilled oil is provided in a single, easily transportable container of components including a flattened floating sock skimmer postionable in the water with a partially submerged open front and an open rear downwardly facing into the water, a crane to facilitate assembly and deployment of the skimmer, a power unit, and towable bags for use in containing oil collected by the skimmer; the container not only provides storage for the components but also functions as a means for separating oil and water removed by the skimmer.

13 Claims, 8 Drawing Figures

(PRIOR ART)

PRESENT INVENTION

SPILLED OIL SKIMMER KIT

REFERENCE TO RELATED APPLICATIONS

This application is a continuation-in-part of application Ser. No. 943,100, filed Sept. 18, 1978 and now abandoned, which is a continuation of application Ser. No. 817,652, filed July 21, 1977 and now abandoned, which in turn is a continuation of application Ser. No. 737,939, filed Nov. 2, 1976 and now abandoned.

BACKGROUND OF THE INVENTION

Oil which is spilled on water has been called the most expensive oil in the world. The cost of removing such oil is not only becoming ever more expensive, but the expenses of repairing damage to shorelines, boats and wildlife is likewise considerable. One major piece of equipment contributing to these increased costs is the skimmer employed for removing oil from water. There has been a trend toward building more sophisticated special purpose skimmers for use in coastal waters. These are specially built boats fitted with oil removal devices. Their construction is such that they are not usually suitable for other work and many of them must be maintained year round in port. As the search for oil has moved into deeper and more treacherous waters, these vessels have become much larger to accommodate the higher sea states, and consequently, much more costly. Much of this cost is for the vessel itself rather than for the actual oil recovery equipment. The high initial cost of the special purpose skimmer and cost of maintaining it, of course, limit the number of these units available. Thus, there is a need in the art to provide a more cost effective approach to oil spill recovery. It is desirable to develop portable skimming devices that fit on vessels of convenience, work boats, supply boats, fishing vessels, etc., which lessen the need for specially constructed vessels and significantly increase the amount of available spill recovery equipment reasonably close to the spill location.

SUMMARY OF THE INVENTION

The present invention in response to the above noted need provides an oil spill cleanup kit that can convert many kinds of vessels into temporary skimmers in a relatively short time. It permits more rapid response to oil spills which occur in remote areas. Such kits are storable on drilling platforms, for example, and if a spill occurs in the vicinity, work boats may be transformed into skimmers that immediately begin cleaning up the spill.

In general, each skimming kit has six components. The first component is the "sock" or actual oil skimming device. Generally, this is one-piece fabrication of rubber or other flexible material which employs a wave-damping section, an oil collection section and multiple integral suction ports for picking up oil. Second, there is a floating frame such as an aluminum frame which supports the forward end of the sock maintaining it open and positioning it at the water's surface. The frame also provides a rapid structure for attaching a two line while allowing the sock to roll and pitch independently of the towing vessel. Third, a hydraulic crane is mounted at one end of each kit to facilitate assembly and deployment of the skinner. Fourth, a pump and power unit is provided for hydraulic power to the crane and to a skimming suction pump. Fifth, a container is provided for storage for all components. It has the standard dimensions and fittings of a typical cargo container so that it can be trucked or shipped easily. The crane is mounted at one end of the container and the pump package at the other. The sock, frame, towable bags, hoses and tools are stored in the centerhold of the container. After these components are removed and deployed, baffles fold out from the container walls, and the centerhold becomes a oil/water separator. Sixth, towable bags are provided in the event of a large spill, so that oil drawn from the top of the oil/water separator is piped to the towable bags for temporary storage.

The first component, the skimming device (sock) above generally described, is towable alongside a vessel by tow means connected to the vessel substantially forward of the skimmer, whereby the motion of the skimmer is effectively uncoupled from the motion of the vessel. Means are provided for self-floating an open front of the sock so that it freely follows surface water motion. A chamber is formed within the sock for receiving oil and water thereinto by (first) the open self-floated front having an upwardly extending lip to prevent wave splashover, (second) a substantially flat, flexible, yet possessing some stiffness, wave-comformable top which contacts the oil, suppresses turbulence associated with wave chop inside the chamber, and prevents occurrence of an air interface between the chamber and the oil, (third) an at least semi-rigid, substantially flat bottom which is only at the forward end of the sock, but of substantial length to act in conjunction with the top, assisted with ties between the top and bottom, to arrest orbital water motion of intercepted waves while not impeding water and oil flow into the chamber, (fourth) sides connecting the top and the bottom which extend rearwardly at least at no greater angle than would substantially constrict water and oil flow within the chamber and preferably parallel or near parallel in the forward section of the skimmer, (fifth) an array of ties which connect the bottom to the top and (a) prevent the top from billowing upward to permit an air interface between the top and the oil, (b) prevent the bottom from billowing downward, increasing the drag forces, (c) give some stiffness to the top to suppress turbulence, and (d) provide a baffling means to arrest orbital water motion, and (sixth) a rear extending downwardly from the top and spaced a substantial distance behind the bottom in order to downwardly direct water exiting from the chamber, whereby the change of current direction in combination with turbulence suppression by the top and arresting of orbital water motion by the forward bottom create an open bottomed quiescent oil capture zone within the chamber allowing oil to collect at the top of the chamber for removal therefrom. Means are also provided for removing the oil from the chamber by well point suction, whereby substantially water-free oil is withdrawn therefrom. Of pertinence to the present invention are U.S. Pat. Nos. 3,886,750 and 3,966,614 as well as patents cited hereinafter.

DESCRIPTION OF PREFERRED EMBODIMENT

Figure 1:
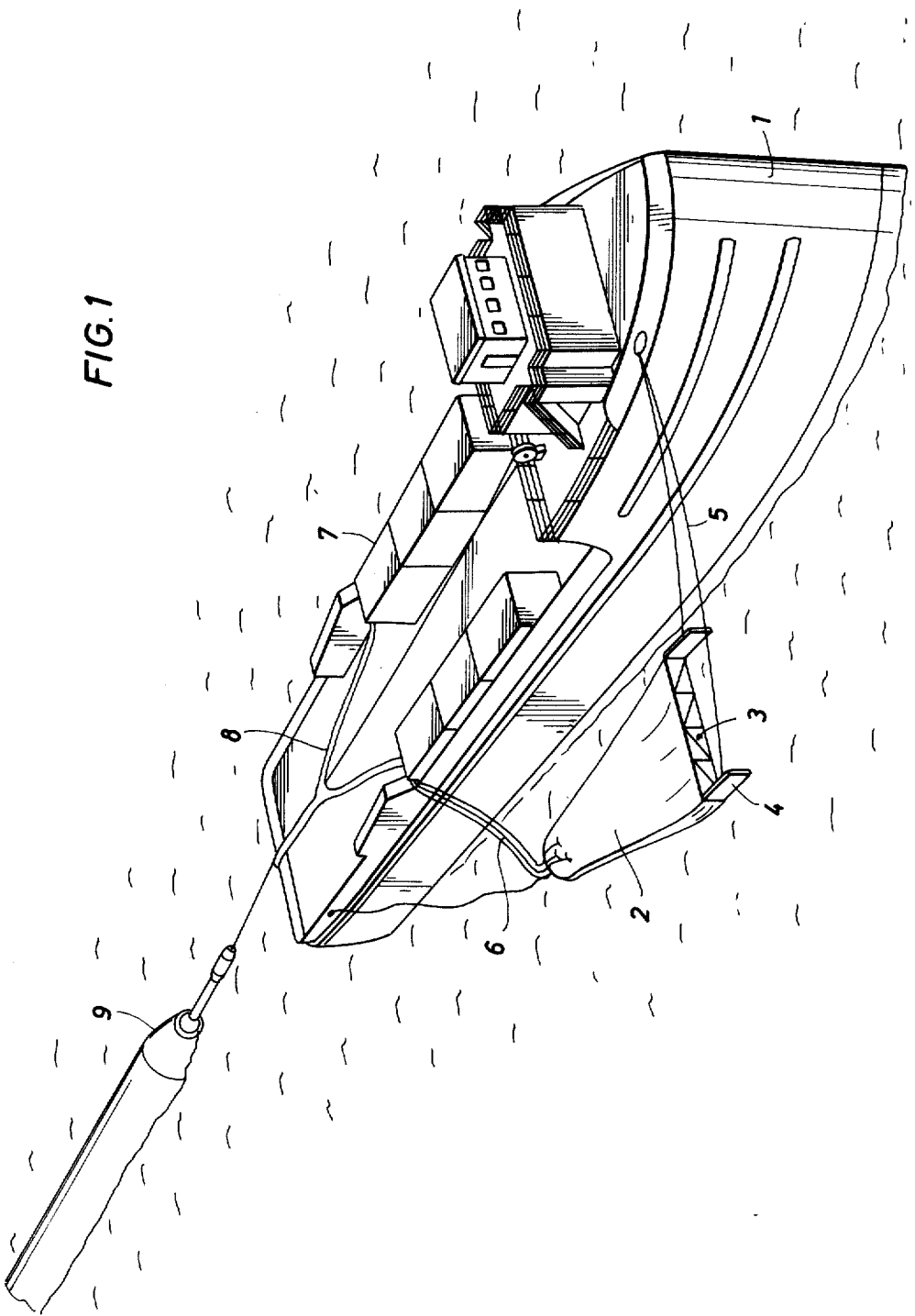
FIG. 1 is a view of a skimmer and towing vessel in operation.
Figure 1A:
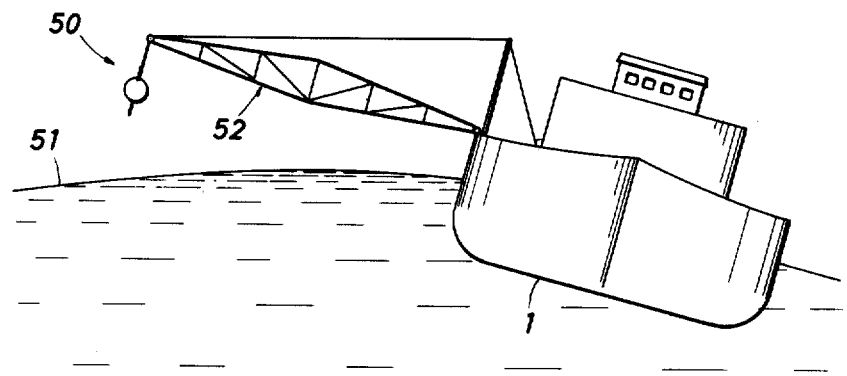
FIG. 1A shows a comparison of the prior art with the present invention.
Figure 1B:
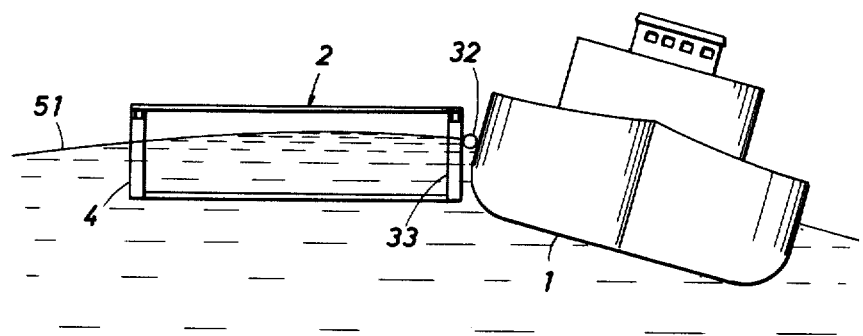
FIG. 1B is a view of the rotatable bumper of the present invention.
Figure 1B:
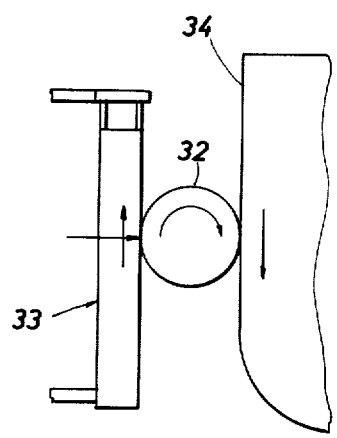

FIG. 1 provides an overall view of the present invention in use with a conventional work boat 1. Skimmer 2 which has the appearance of a flattened sock with an open front end is maintained open by floating frame 3 and with floats 4. The frame is attached to the work boat by lines 5 which connect with the boat well ahead of the position alongside the boat where the skimmer is deployed. With the lines placed forward and with a special bumper (described hereafter) the motion of the skimmer is effectively uncoupled from the motion of the boat, thereby allowing the skimmer to move freely up and down, pitch, roll, etc. In the prior art where a skimmer or boom is deployed alongside a vessel by a rigid connection, the motion of the vessel is translated into the skimmer or boom, causing it to dip beneath the water or raise above the water and in either case permitting oil to pass thereby, thus hindering effective removal of the oil from the water. U.S. Pat. No. 3,983,034 exemplifies the prior art in its employment of cable supported outrigger 68 which causes outboard boom 66 to dip in and out of the water with the roll of the vessel. FIG. 1a shows how the self-floated skimmer of the present invention remains uncoupled from the roll motion of the vessel 1 while the skimmer of the prior art permits the oil boom 50 (supported by outrigger 52) to raise out of the water 51 (or sink into the water if the roll were reversed) thereby causing oil to escape. A bumper 32 is deployable between the inboard float 33 of the skimmer of the present invention and the vessel 1 to prevent damage to the vessel by the skimmer. Note how the rotatable bumper 32 acts as a hinge to uncouple the motions. FIG. 1B shows how the rotatable bumper 32 permits the float 33 to raise up and maintain the desired water level even though the vessel side 34 is falling. This ability to translate (float and vessel) is important in preventing oil loss between the skimmer and the vessel. Clearly, impact damage to the skimmer or the vessel is also prevented by such a bumper.

Oil lines 6 from the rear part of the skimmer pass oil into the container 7 which is employed both as a device for separating oil and water from the skimmer, as more particularly described hereinafter, and also as a container for the skimmer and power components used to deploy the skimmer. Oil lines 8 extend from container 7 to a bag 9 towable behind the work boat 1 as a convenient means for storing separated oil, especially in the instance of larger spills which require extra storage space.

Figure 2:
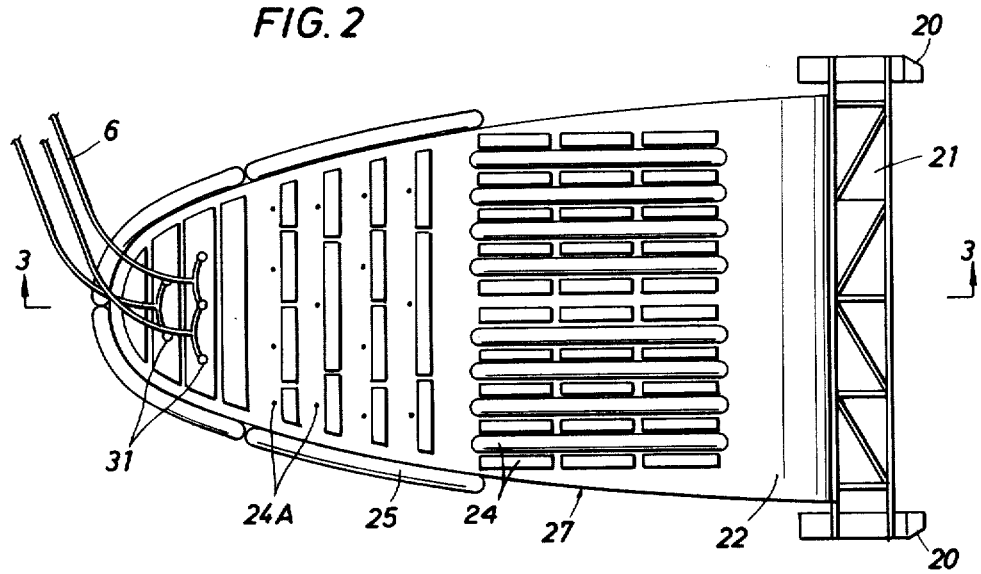
FIGS. 2 and 3 are top and sectional views, respectively, of the skimmer.
Figure 3A:
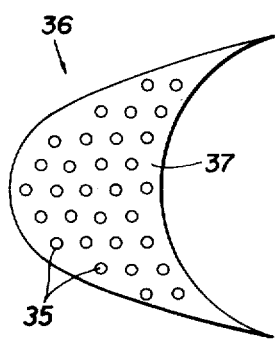
FIG. 3A shows an insert located in the bottom rear of the skimmer of FIG. 3.
Figure 3:
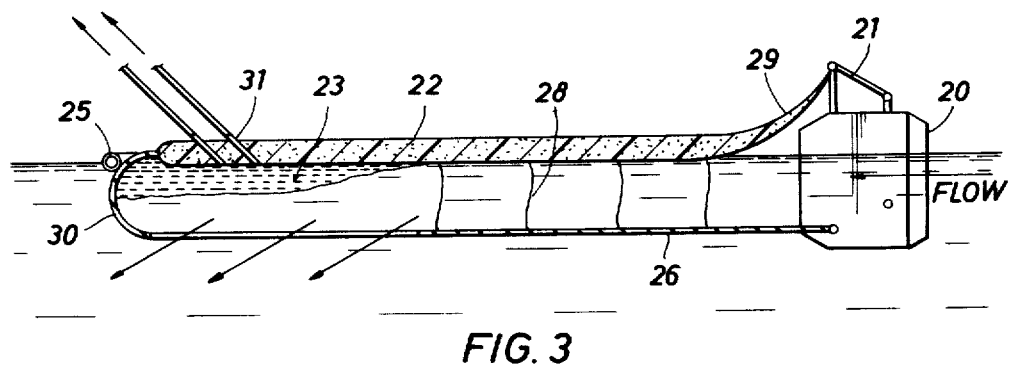

Referring now to FIGS. 2 and 3 of the drawings, a more detailed view of the skimmer is shown. The skimmer includes floats 20 which are mounted on opposite sides of a frame 21 which holds the front of the skimmer open and in a position to receive incoming oil and water. The top of the skimmer 22 is of a flexible material such as nitrile rubber or rubberized fabric which flexes easily with incoming waves and entrapped air. Air exhaust ports 24a expel air captured by the sock and prevent the occurrence of any air space between the top of the skimmer 22 and collected oil 23. This makes the removal of oil from the skimmer much easier as will be discussed more particularly hereinafter. By comparison, the funnel disclosed in U.S. Pat. No. 3,653,510 does not have vents and allows air pockets to form in the rear of the funnel in the oil collection area.

The skimmer top 22 is provided with air or pneumatic and foam flotation 24 which keeps the top of the skimmer above water level and yet does not raise it above the oil level as above noted. The foam flotation provides permanent stiffness for the top part, while the pneumatic flotation provides adjustable stiffness, depending on skimming speed and wave conditon. Inflatable flotation 25 is provided around the sides of the rear section of the skimmer. The bottom of the skimmer 26 as shown in FIG. 3 is spaced from the top of the skimmer by side walls 27 and ties 28 which prevent the top of the skimmer from billowing and further prevent an air interface between top 22 and collected oil 23. The skimmer has an open bottom 26a between the rear of the bottom 26 and the rear "curtain" section 30 to allow water to exit. Preferably, side walls 27 are parallel or almost parallel to each other in the forward part of the skimmer. Thus, tapering of the side walls toward each other is predominantly in the aft part of the skimmer. This permits the entry of incoming wave trains without reflections and resulting oil loss around the skimmer Hence the skimmer is essentially like an open window to incoming oil and water. By comparison, the sharply tapered funnel shown in U.S. Pat. No. 3,653,510 focuses incoming wave trains in front of the skimmer, and deflects incoming oil around the sides of and then behind the skimmer.

Top 22 and bottom 26 articulate easily with large waves and swells and yet the water motion within the skimmer is relatively quiescent not only because the top 22 tends to dampen wave chop but also because bottom 26 supported by the top 22 through ties 28 intercepts wave particle motion and sharply reduces orbital water motion within the skimmer which normally would sweep oil down and out of the skimmer. The ties 28 and the flotation 24 add some stiffness to the skimmer which tends to baffle or dampen "chop," i.e., the high frequency components of waves, yet still allows the skimmer to "ride" with the major low-frequency components of the waves. Stiffness may be varied from forward to aft (preferably the forward section is more stiff) by varying air pressure in different parts of the flotation, i.e, less pressure in aft sections, and by providing more flexible ties in the aft part of the skimmer. By comparison, the funnel described in U.S. Pat. No. 3,653,510 has no ties and no stiffening flotation elements to dampen wave chop.

The skimmer is purposely designed with an upwardly extended lip 29 which prevents wave splashover, particularly in the case of extremely choppy water. The raised lip flexes, presenting little interference to incoming waves permitting the skimmer to behave essentially as an open window with the floats 20 being to either side of the window or mouth to control the mean water elevation of the mouth. The device of U.S. Pat. No. 3,653,510 on the other hand, has no raised flexible lip, and it employs stiff, discrete floats in the mouth of the skimmer, both of which cause wave/structure collisions resulting in the oil being entrained in the water, passing around the skimmer and then being lost.

Water and oil entering the skimmer as shown by arrows in FIG. 3 proceed to the rear section 30 which is concave facing toward the front of the skimmer and water exits at the bottom of the skimmer, the oil remaining at the top part of the skimmer with any debris which collects within the skimmer.

While the bottom-rear of the skimmer may be generally open as shown in FIG. 3, a more preferred arrangement is shown in FIG. 3A. A crescent-shaped piece 36 formed preferably of a double layered fabric 37 having crossing warp directions, is provided with holes 35 so that the crescent is about 25-75% closed. This functions to hold down and stabilize the rear of the skimmer, providing a more quiet collection region for the oil.

The rear of the skimmer may be raised periodically to allow debris which cannot be pumped to be exhausted. Alternatively, a large-mesh (1 inch to 12 inch) net may be provided at the mouth of the skimmer to prevent at least large debris from entering into the skimmer. The rather open net does not significantly hinder the entry of oil and water into the skimmer.

An air interface is not allowed between the top of the skimmer and the oil. The oil is selectively withdrawn from the skimmer by well point suction, preferably through a number of smaller oil recovery suction points 31 rather than through a single large suction point. Undesirably, more water and less oil is withdrawn through a single large suction device, particularly one which is not integral well point suction but which floats on the oil sump and, in the case of prior art skimmers, moves up and down with wave motion, alternately pulling air above the oil sump and then water below the oil sump. Well point suction provides a smooth surface about the mouth of the withdrawal lines 31 so that there is no disturbance to the flow of oil into the lines. By comparison, the skimmer of U.S. Pat. No. 3,715,034 employs a baffle plate 26 which disrupts flow into line 24 due to wave oscillations.

Figure 4:
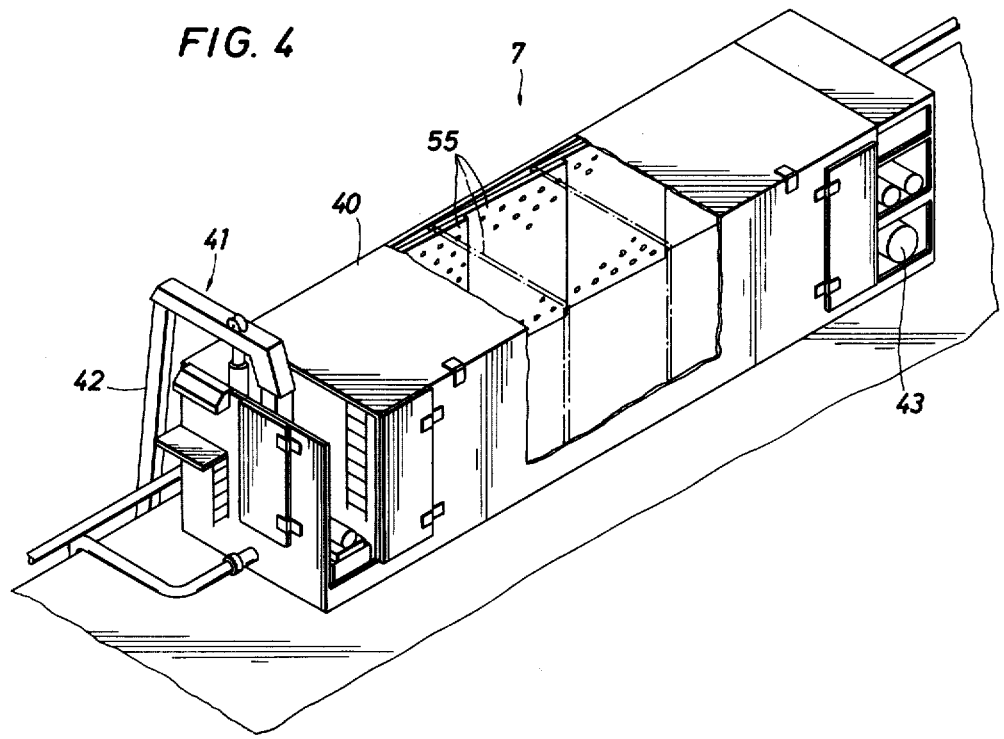
FIG. 4 is a view of a hydraulic crane, and power package with a container.

Referring now to FIG. 4 of the invention, there is shown a more detailed disclosure of the container 7 shown in FIG. 1. Container 7 includes all the components necessary for use with the present invention. As already mentioned, it is practical to store the container on drilling platforms to be near potential spills. If an oil spill is reported to the platform, the device is quickly loaded on board a work boat. The components of the skimmer can be assembled on deck so the boat proceeds toward the spill and be ready for deployment upon arrival. After use, the device can be repaired, cleaned and re-packaged to wait for its next use. The kit includes a hinged cover 40 which opens to disclose the skimmer nestled within the container 7, hydraulic crane 41 which is used to deploy the skimmer from the container alongside a work boat or other vessel of convenience, crane controls 42 which are employed to direct the operation of deploying the skimmer, and a power package 43 which powers the hydraulic crane 41 and other devices necessary for operation of the skimmer.

Figure 5:
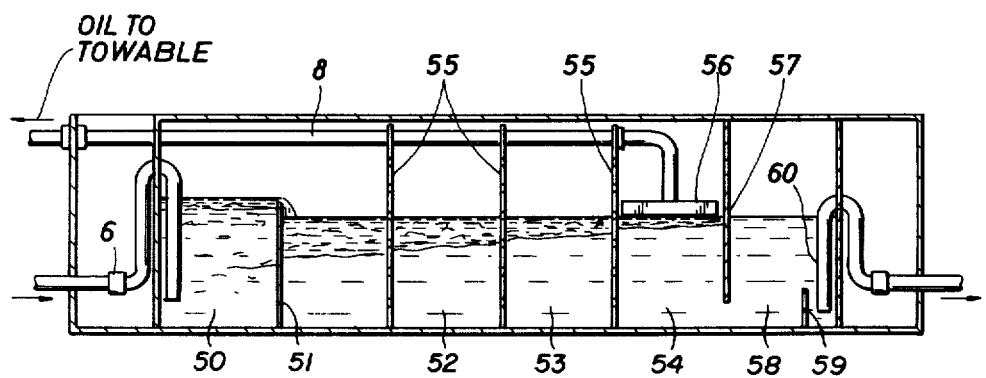
FIG. 5 is a view of the container being used for separating oil from water recovered by the skimmer of FIGS. 2 and 3.

FIG. 5 discloses the container of FIG. 4 in use for separating oil and water from the skimmer. An oil/water mixture comes from the skimmer via line 6 and proceeds into a first compartment 50 which is formed by one end of the container and a solid overflow baffle 51 and into one of several chambers 52 through 54 formed by perforated surge baffles 55. The oil and water flow through these chambers and into next-to-terminal chamber 54 formed by one of the perforated baffles 55 where oil is removed by floating suction head 56 and flowed via line 8 to a towable bag 9 as shown in FIG. 1. Water from the next-to-terminal chamber 54 passes beneath a solid underflow baffle 57 and into terminal chamber 58. A smaller baffle 59 is provided ahead of line 60 which removes clear water from chamber 58. The baffles, except for baffle 59, are all hinged so that they fold against the sides of the container when not in use and allow deployment of the skimmer and associated components within the container.

While the skimmer of the present invention is preferably employed alongside a moving vessel, it is apparent that it may also be used in a stationary position in streams or currents for oil collection purposes with or without a vessel. Also, it may be deployed between hulls of a catamaran vessel. Manifestly, the present invention is useful also for collecting floating debris and floating liquid pollutants other than oil. Where possible, multiple skimmers may be deployed on one or both sides of the vessel in use. The container is useful also with other water/oil separation techniques known in the art. Similarly, the wave damping part of the skimmer of this invention can be used separately to reduce wave turbulence in front of other types of skimmers.

For particularly viscous oils, an absorbent rope belt (U.S. Pat. No. 3,668,118) can be threaded into the sock and used in place of the integral well point suction components. Of course, even though the oil to be removed is amenable to well point suction, any endless loop sorbent can be used in place of well point suction (U.S. Pat. No. 3,700,593). For both viscous oils and debris, nets having a suitable fineness can be held in the water just behind the sock; the rear of the sock can be raised, allowing accumulated oil and debris to spill into the trailing net. If the net is hoisted from the water surface, water drains out and the remaining contaminant is deposited in the top of the container in a batch process.

I claim as my invention:

1. Apparatus for removing oil from the surface of a turbulent body of water comprising, a chamber for receiving water and oil thereinto during relative movement between the apparatus and the body of water, the chamber being formed by (a) an open, self-floated front, (b) a substantially flat and oil impermeable top, which contacts the body of water and is sufficiently flexible to conform to long waves, (c) a substantially flat and water impermeable flexible bottom ahead of a discharge opening, which bottom intercepts and baffles orbital water motion of incoming shorter waves, (d) sides connecting the bottom and top and extending rearwardly at least no greater angle than would constrict water flow within the chamber and thus focus and reflect incoming waves, (e) ties connecting the top and bottom and giving some stiffness to the top which forms a baffle to suppress wave chop within the chamber, (f) the discharge opening being in the rear of the chamber, which opening directs the exiting flow of water downward and rearwardly, and (g) means for withdrawing oil from the top of the rear of the chamber thus formed.

2. The apparatus of claim 1 including cable or rope tow means connecting the open, self-floated front of the chamber to a vessel at a point on the vessel substantially forward of the chamber, whereby roll motions of the vessel do not propagate through the tow means and cause undesirable motion of the chamber.

3. The apparatus of claim 2 including roller means at the front of the chamber on the side adjacent the vessel, which allows the self-floated chamber front to move essentially vertically against the side of the vessel to further uncouple the motions of the chamber from those of the vessel in the presence of high forces of the chamber front against the vessel caused by drag pressures on the chamber resisted at this location.

4. The apparatus of claim 1 including flotation means in the top which add some stiffness to the top to further suppress wave chop.

5. The apparatus of claim 4 wherein at least some of the the flotation is pneumatic, permitting adjustment of the stiffness of the chamber top to suppress wave chop in the presence of varying speed and wave conditions.

6. The apparatus of claim 1 including a flexible upwardly extending lip at least near the self-floated front to cushion the waves entering the front of the chamber, thus avoiding excessive and undesirable turbulence in the chamber.

7. The apparatus of claim 6 wherein flotation means for the self-floated, open front consists of discrete, slender floats on either side of the front to make the front substantially transparent to the incoming waves.

8. The apparatus of claim 7 wherein the floats are connected by a framework which holds the upwardly extending lip and constrains the shape of the opening to the chamber.

9. The apparatus of claim 1 wherein vents are provided in the mid-section of the top of the chamber to permit escape of captured air from the chamber brought in by incoming waves while minimizing oil loss therefrom.

10. The apparatus of claim 9 wherein suction means is located at unrestricted openings in the rear-section of the flexible top and substantially forward of the rear of the skimmer.

11. The apparatus of claim 10 wherein the suction means does not extend substantially below the flexible top, whereby suction is applied at the interface of the flexible top and collected oil.

12. Apparatus for removing oil from the surface of a turbulent body of water comprising, a chamber for receiving water and oil thereinto during relative movement between the apparatus and the body of water, the chamber being formed by (a) an open, self-floated front, (b) a substantially flat and oil impermeable top, which contacts the body of water and is sufficiently flexible to conform to long waves, (c) a substantially flat and water impermeable flexible bottom ahead of a discharge opening, which bottom intercepts and baffles orbital water motion of incoming shorter waves, (d) sides connecting the bottom and top and extending rearwardly at least no greater angle than would substantially constrict water flow within the chamber and thus focus and reflect incoming waves, (e) the discharge opening being in the rear of the chamber which, opening directs the exiting flow of water downward and rearwardly, and (f) means for withdrawing oil from the top of the rear of the chamber thus formed.

13. Apparatus for removing oil from the surface of a turbulent body of water comprising, a chamber for receiving water and oil thereinto during relative movement between the apparatus and the body of water, the chamber being formed by (a) an open, self-floated front, (b) a substantially flat and oil impermeable top, which contacts the body of water and is sufficiently flexible to conform to long waves, (c) a substantially flat and water impermeable flexible bottom ahead of a discharge opening, which bottom intercepts and baffles orbital water motion of incoming shorter waves, (d) sides connecting the bottom and top and extending rearwardly at least at no greater angle than would constrict water flow within the chamber and thus focus and reflect incoming waves, (e) ties connecting the top and bottom and giving some stiffness to the top which forms a baffle to suppress wave chop within the chamber, (f) the discharge opening being in the rear of the chamber, which opening permits the exiting flow of water downward and rearwardly, and being partially covered at the extreme rear thereof by a crescent-shaped, perforated member which is about 25 to 75% closed and which functions to hold down the rear of the chamber to which it is attached while still permitting water to exit therethrough, and (g) means for withdrawing oil from the top of the rear of the chamber thus formed.

* * * * *